United States Patent [19]
Evans et al.

[11] 3,733,910
[45] May 22, 1973

[54] TURBINE METER ASSEMBLY

[75] Inventors: Howard J. Evans, Kensington, Pa.;
Joseph P. Lofink, Lancaster, Ohio;
Joseph A. Bonner, Pittsburgh, Pa.

[73] Assignee: Rockwell Manufacturing Company,
Pittsburgh, Pa.

[22] Filed: July 14, 1971

[21] Appl. No.: 162,639

Related U.S. Application Data

[63] Continuation of Ser. No. 838,890, July 3, 1969, abandoned.

[52] U.S. Cl. ............................................. 73/231 R
[51] Int. Cl. ............................................... G01f 3/00
[58] Field of Search ............................... 73/229-231

[56] References Cited

UNITED STATES PATENTS

| | | | |
|---|---|---|---|
| 3,388,595 | 6/1968 | Last | 73/231 |
| 3,350,938 | 11/1967 | Rittenhouse | 73/231 |
| 2,962,895 | 12/1960 | Rumble | 73/231 |
| 3,163,041 | 12/1964 | Karlby | 73/231 |
| 3,304,780 | 2/1967 | Lee et al. | 73/231 |
| 3,398,577 | 8/1968 | Kovats et al. | 73/231 |

FOREIGN PATENTS OR APPLICATIONS

| | | | |
|---|---|---|---|
| 1,127,096 | 4/1962 | Germany | 73/231 |

*Primary Examiner*—Richard C. Queisser
*Assistant Examiner*—Arthur E. Kerkosz
*Attorney*—Strauch, Nolan, Neale, Nies & Kurz

[57] ABSTRACT

A turbine meter has a measuring chamber assembly complete with rotor and a magnetic drive train to an external register mounted on a detachable cover plate mounted over a side opening in a hollow-meter body. The measuring chamber assembly has a special slide guide fit and internal seating on the body, and it can be inserted into the body only in proper orientation in the flow path. An adapter plate on the inside of the cover positions the measuring chamber assembly relative to the cover plate. A special sealed casing magnetic drive includes rotatably mounting the driver and driven magnets on common shaft means oppositely projecting from the casing end wall.

19 Claims, 16 Drawing Figures

INVENTORS
HOWARD JOHN EVANS
JOSEPH PETER LOFINK
JOSEPH ALVIN BONNER

INVENTORS
HOWARD JOHN EVANS
JOSEPH PETER LOFINK
JOSEPH ALVIN BONNER

BY Strauch, Nolan, Neale, Nies & Kurz

ATTORNEYS

INVENTORS
HOWARD JOHN EVANS
JOSEPH PETER LOFINK
BY  JOSEPH ALVIN BONNER
*Strauch, Nolan, Neale,*
*Nies & Kurz*
ATTORNEYS

INVENTORS
HOWARD JOHN EVANS
JOSEPH PETER LOFINK
JOSEPH ALVIN BONNER

BY Strauch, Nolan, Neale, Nies & Kurz
ATTORNEYS

TURBINE METER ASSEMBLY

CROSS REFERENCE TO RELATED APPLICATIONS

This application is a continuation of Ser. No. 838,890, filed July 3, 1969, now abandoned.

BACKGROUND AND SUMMARY OF INVENTION

The invention relates to turbine meters of the type wherein flow of gas or like fluid through a meter body rotates a rotor connected by gearing and associated mechanism to a register which may be suitably calibrated. Turbine meters of this type are generally known and are constantly being improved for increasing accuracies.

One of the problems involved in providing a suitable meter of this type involves the proper location of the rotor within the fluid flow path. If the rotor is not properly mounted normal to the flow of gas, difficulty is experienced in accurately calibrating and maintaining registration in the meter. The invention provides a novel manner of mounting a measuring chamber assembly including a rotor and associated drive mechanism within the meter body so that upon assembly the rotor is automatically accurately located normal to gas flow, and this is a major object of the invention.

Another object of the invention is to provide a novel turbine meter assembly wherein a measuring chamber unit complete with rotor, shafts and drive gearing is suspended from a cover disposed over an opening in the meter body, provision also being made that the rotor end of the unit is always properly axially located in the assembly.

A further object of the invention is to provide a novel turbine meter assembly wherein a measuring chamber unit is suspended from a cover over an opening in the meter body and an adapter plate or like device is provided between the cover and unit which locates the unit longitudinally in the flow path.

The adapter plate may also serve as a lift connection between the housing of the unit and the cover enabling the unit to be withdrawn from the meter body without disturbing or damaging the drive connection between the rotor and the register mounted on the cover, and this is another object of the invention.

A further object of the invention is to provide a turbine meter incorporating a novel measuring chamber construction featuring internal pressure balance, pressure tight mounting of the measuring chamber housing within the meter body to assure flow of all fluid to be measured through the measuring chamber and special drive gearing arrangements and support.

It is a further object of the invention to provide a turbine meter having a novel drive between the rotor and register featuring a special magnetic drive arrangement that compensates for small misalignments in assembly and assures accurate and efficient alignment and cooperative location of the magnetic drive components.

PREFERRED EMBODIMENTS

Figure 1:
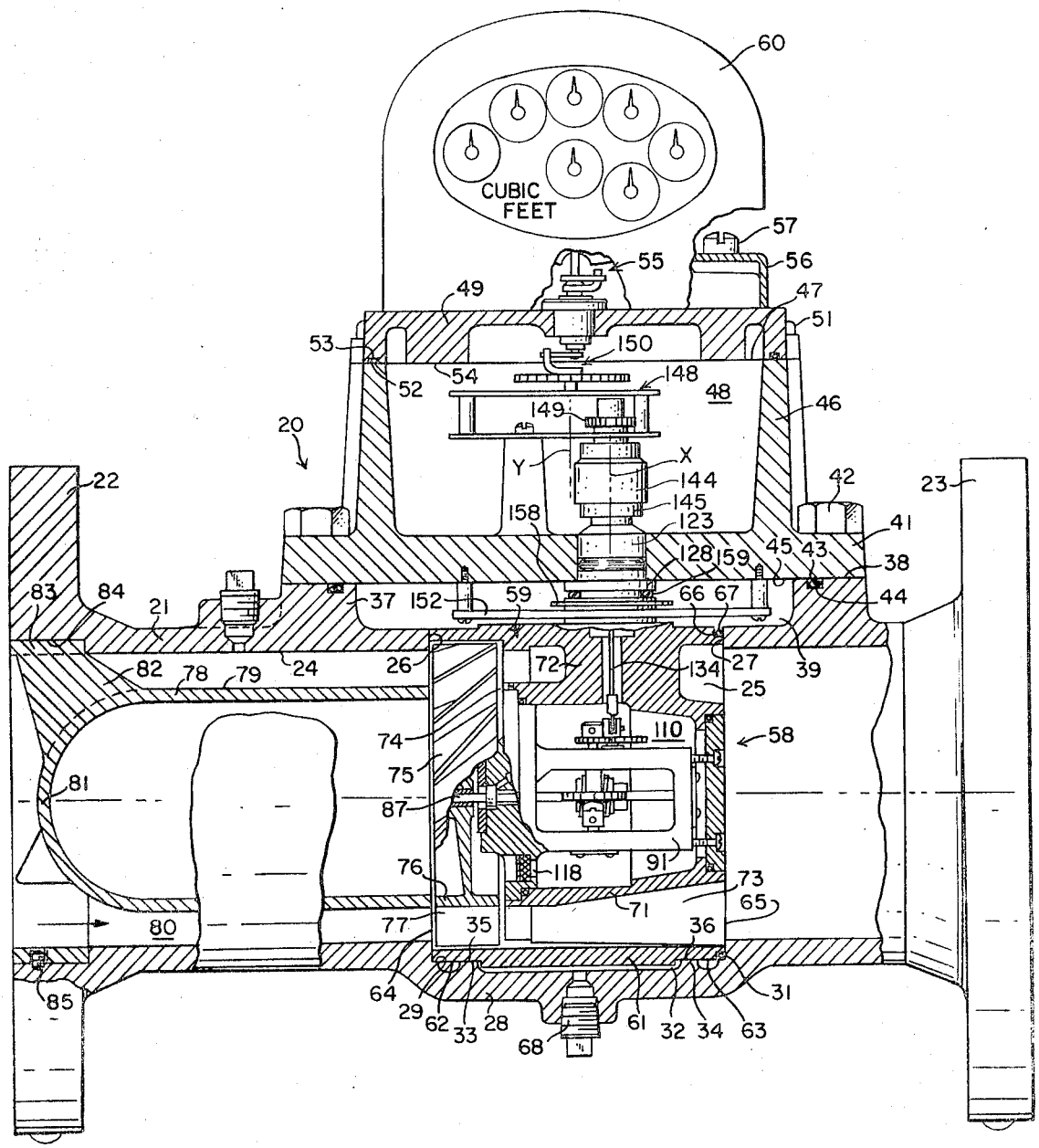
FIG. 1 is a side elevation mainly broken away and sectioned showing a gas turbine meter assembly according to a preferred embodiment of the invention.

The turbometer assembly 20 shown in FIG. 1 comprises a relatively rigid integral hollow body 21 having at opposide ends respective upstream and downstream flanges 22 and 23 for bolting or similarly securing the assembly to associated pipeline flanges (not shown) so that the cylindrical inner wall surface 24 constitutes an effective uniform diameter continuation of the pipeline.

Body 21 is formed about midway between the flanges with a relatively large upwardly facing opening indicated at 25. The body wall at opposite ends of the opening has flat parallel smooth guide surfaces 26 and 27 at right angles to the axis of surface 24, and these end surfaces extend into the body bottom wall 28 to intersect arcuate parallel machined smooth shoulder seating surfaces 29 and 31.

Intermediate these shoulders the bottom wall is recessed at 32 except for longitudinally spaced ribs 33 and 34 having arcuate parallel smooth machined surfaces 35 and 36. Ribs 33 and 34 are equally spaced from shoulder 29 and 31, and the surfaces 29, 31, 35 and 36 are of concentric cylindrical contour and extend for about 180° around the interior of the bottom wall between opposite sides of opening 25 for a purpose to appear.

Opening 25 is effectively surrounded by an upstanding integral body ledge 37 having a flat annular face 38 and laterally enclosing a space 39 above the opening. Space 39 is closed by a top cover plate 41, as by bolts 42 extending into ledge 37. A resilient O-ring 43 disposed in groove 44 and compressed by engagement with the flat underside 45 of plate 41 provides a fluid tight seal.

Plate 41 is formed with an upstanding hollow boss 46 having an annular flat top surface 47 and enclosing a drive mechanism space 48. Space 48 is closed by a register mount plate 49 secured upon boss 46 as by a series of bolts 51. A resilient O-ring 52 disposed in a groove 53 in the flat underside 54 of plate 49 is compressed against surface 47 to provide a fluid tight seal. A suitable register drive mechanism 55 is mounted on the upper side of plate 49 and enclosed fluid tight by a cover 56 secured to plate 49 as by screws 57. A register is indicated at 60.

An internal measuring chamber unit 58 is effectively suspended from plate 41 and fits snugly and fluid tight within opening 25. Meter unit 58 comprises a housing 59 having an outer peripheral wall 61 that is formed at opposite ends with smooth cylindrical peripheral surfaces 62 and 63 that are smoothly cradled and located accurately on surfaces 29, 35, 36, 31 in the assembly. The upper 180° of wall 61 is disposed in opening 25 to form an effective continuation of the main body wall. Housing 59 has opposite end surfaces 64 and 65 that are smooth, parallel and flat, and are adapted to fit in close slidable engagement with body guide surfaces 26 and 27. At one end housing wall 61 is grooved at 66 to mount a resilient O-ring 67 that is compressed between housing 59 and adjacent meter body surfaces to provide a fluid tight seal. A drain plug 68 is provided for access to the space 32 below housing 59.

Figure 8:
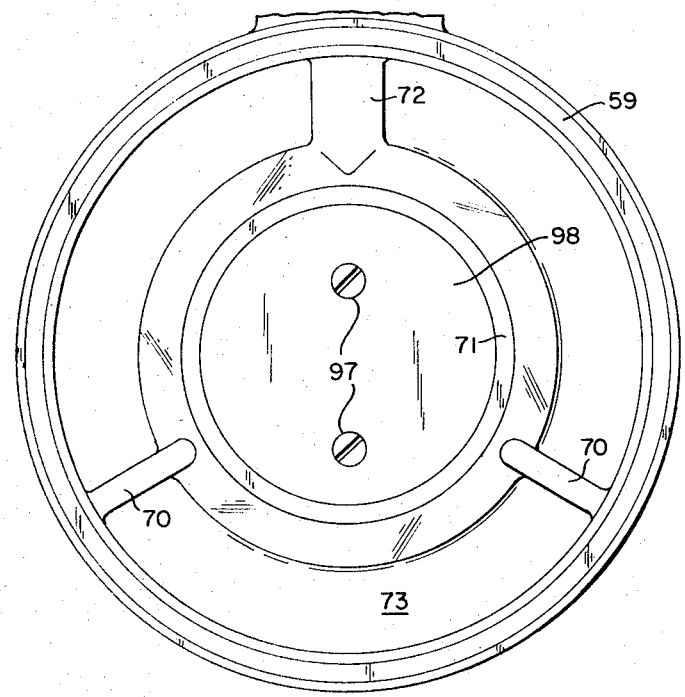
FIG. 8 is an end view of the assembly substantially at line 8—8 of FIG. 2.
Figure 9:
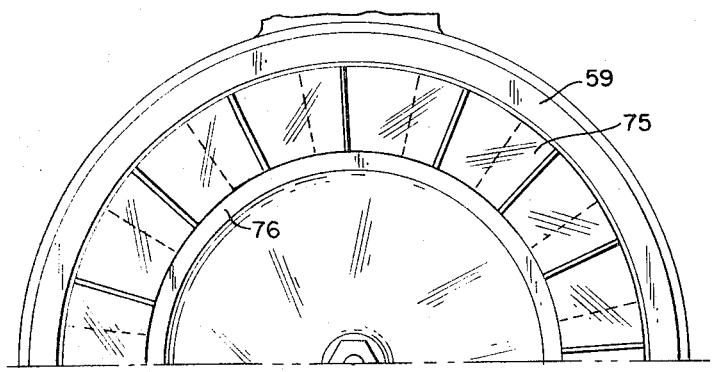
FIG. 9 is a fragmentary end view substantially on line 9—9 of FIG. 2 showing rotor detail.

Housing 59 is provided with an annular inner peripheral wall 71 integrally rigidly secured to outer wall 61 by equiangularly spaced columns or ribs 70 and 72 (FIG. 8). An annular flow passage 73 is defined through the measuring chamber. Upstream of passage 73 and wall 71, outer housing 61 has an open end chamber 74 within which is disposed a rotor 75 mounted for free rotation on the flow axis of the meter.

Rotor 75 is of a conventional type having an annular rim 76 substantially in alignment with wall 71 and a series of helically arranged peripheral blades 77. Upstream of housing 59, a stationary flow passage defining and baffle member 78 is fixedly mounted within the body. Member 78 comprises an externally smooth cylindrical tubular portion 79 terminating adjacent and in substantial longitudinal alignment with the rim of rotor 75 so as to define an annular flow passage section 80 aligned with passage 73 and having a closed rounded smooth upstream end 81. Member 78 is supported in the body as by three or more radial fins 82 integral with an annular rim 83 extending into a shoulder 84 and fixed as by a set screw 85.

Member 78 is therefore rigidly mounted centrally of the flow passage by the seating of rim 83 in shoulder 84. The diameter of member 78 is substantially equal to that of rotor rim 76 and the inner free end of member 78 terminates adjacent but in spaced running clearance relation to rotor rim 76.

The flow passage sections 73 and 80 are thus longitudinally aligned with each other and the bladed periphery of rotor 75, so that all fluid flow into the meter body is directed properly through the rotor blades to effect proportionate rotation of the rotor.

Referring to FIGS. 1, 2 and 12-15 rotor 75 is fixed upon a horizontal rotor shaft 87 that is freely rotatably mounted in bearings 88 and 89 carried by an internal bracket 91. At its end adjacent the rotor, bracket 91 has an enlarged cylindrical flange 92 piloted within the cylindrical inner surface of wall 71 and a cylindrical end flange 93 piloted within a cylindrical end recess 94 in wall 71. A resilient O-ring seal 95 (FIG. 2) is compressed between flanges 92 and 93 and the end of wall 71.

At its other end bracket 91 is formed with upper and lower threaded bores 96 (FIG. 13) into which extend screws 97 (FIG. 2) mounted in a plate 98 closing the downstream end of the internal housing formed by wall 71. A resilient O-ring seal 99 is compressed between plate 98 and wall 71.

Thus, when flange 93 is disposed within recess 94 and screws 97 are drawn tight, bracket 91 is rigidly secured within the housing 58. A dowel pin 100 extending through a suitable aperture in wall 71 is provided for locating bracket 91.

Figure 13:
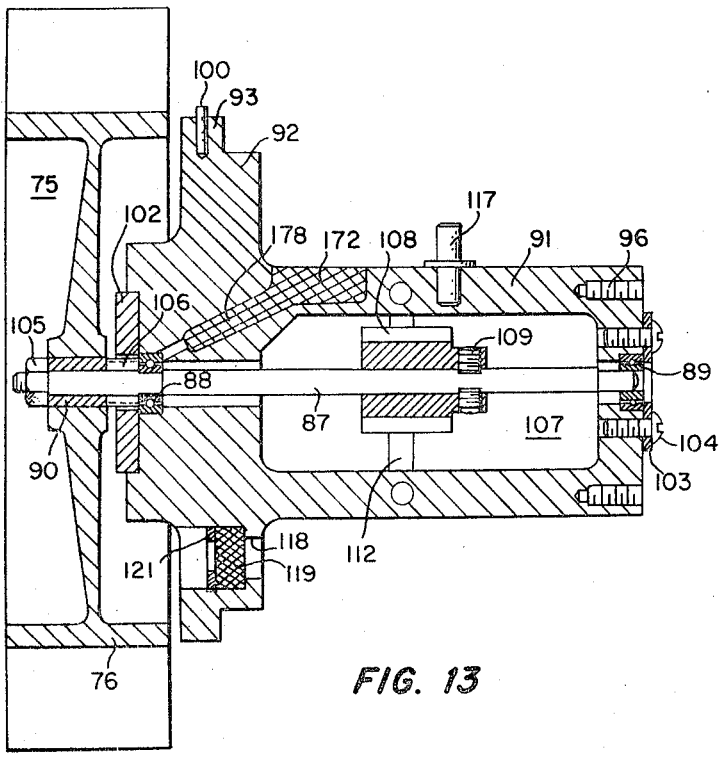
FIG. 13 is a side elevation in section further showing the drive mechanism of FIG. 12.
Figure 15:
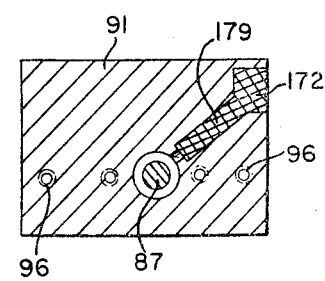
FIG. 15 is a section substantially on line 15—15 of FIG. 13.

As shown in FIG. 13, bearing 88 is retained within an end recess in bracket 91 by a retainer plate 102 secured as by screws 102' (FIG. 12) to the bracket end. Similarly bearing 89 is secured within an opposite end recess in the bracket by a retainer plate 103 secured to the bracket end by screws 104.

At its upstream end rotor shaft 87 is threaded to receive a nut 105 which when tightened clamps the rotor hub axially rigid with a sealing spacer 106 on the shaft and the inner race of bearing 88, whereby rotation of the rotor will rotate shaft 87. Where the rotor is a molded unit of hard light weight plastic, as may be preferable, a rigid steel insert 90 is pressed within the hub to prevent axial crushing. The interior of spacer 106 is preferably formed as a labyrinth to prevent lubricant escape along the shaft. The other end of shaft 87 is reduced to be nonrotatably mounted within the inner race of bearing 89.

As shown in FIG. 13, the intermediate section of shaft 87 is disposed in a space 107 within bracket 91, and a worm 108 is secured non-rotatably to the shaft as by screws 109. Worm 108 is meshed with a worm wheel 111 (FIG. 14) fixed on a vertical shaft 112. A collar 113' rigid with worm wheel 111 is fixed to shaft 112 by screws 113, and a spacer 113'' is axially clamped between worm wheel 111 and the bracket. Shaft 112 projects upwardly through an opening in bracket 91 to mount a gear 114 secured thereon as by set screw 115. Gear 114 is meshed with a gear 116 (FIG. 2) rotatably mounted on a vertical stub shaft 117 on the top of bracket 91.

The flanged end of bracket 91 adjacent the rotor is formed as shown in FIG. 13 with an opening 118 over the upstream side of which is disposed a filter disc 119 of suitably porous material held in place as by a snap ring 121. The purpose of this arrangement is to permit some of the gas being metered to pass into the interior of the internal housing within wall 71 for establishing a pressure balance, and filter 119 removes particles that might damage the rotor shaft bearings or the gears.

Figure 14:
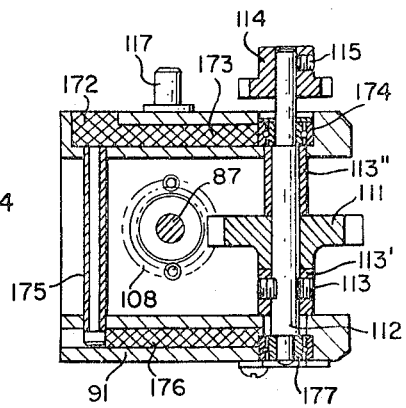
FIG. 14 is a section substantially on line 14—14 of FIG. 13.

As shown in FIG. 14, lubricant supplied to a recess 172 on the upper end of the bracket may pass through passage 173 to the upper bearing 174 for shaft 112, and through oil tube 175 and passage 176 to the lower bearing 177 for shaft 112. A diagonal passage 178 (FIG. 13) conducts lubricant from recess 172 to bearing 88, and bearing 89 is lubricated through passage 179 shown in FIG. 15. Space 107 may be grease filled for lubrication of the gearing and to prevent fluid flow therethrough.

Bracket 91, with the rotor and rotor shaft mounted thereon and drive connected to the gear train to and including gear 114, comprise a removable subassembly that is mounted in housing 59 by insertion through the open end of the internal housing at 71. When screws 97 are drawn tight bracket 91, plate 98 and housing 71 are drawn into an assembly that is axially sealed at 95 and 99, an rotor 75 is properly located axially in the assembly within the measuring chamber. Bracket 91 and plate 98 when so assembled in housing 59 define space 110.

Meter unit 58 is formed through column 72 with a vertical bore 120 extending from space 110 to an enlarged bore section 120'. A tubular casing 122 has an intermediate enlarged portion 123 passing through an opening 124 in plate 41 where it is surrounded by a radially compressed seal ring 125. The upper end of casing 122 is closed at wall 126, and the open cylindrical lower end 127 of casing 122 is snugly slidably fitted in engagement within cylindrical bore section 120'. Casing 122 is mounted in the assembly with its radial flange 128 abutting the underside of plate 41.

A support 129 is fixedly mounted in casing end wall 126 for rigidly fixedly mounting a stub shaft 131 projecting into casing 122 and a coaxial stub shaft 132 projecting toward the register. Preferably stub shafts 131 and 132 are opposite ends of a single shaft element fixed on support 129. Support 129 may be an integral enlargement of a single shaft having sections 131 and 132.

Figure 10:
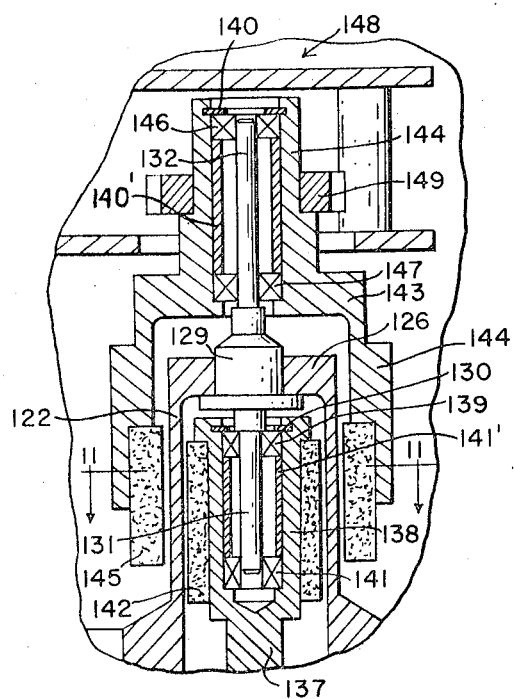
FIG. 10 is an enlarged elevation in section showing details of the magnetic drive to the register.
Figure 11:
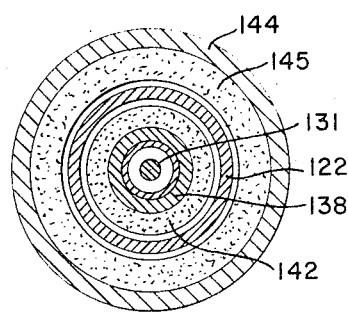
FIG. 11 is a section substantially on line 11—11 of FIG. 10.
Figure 12:
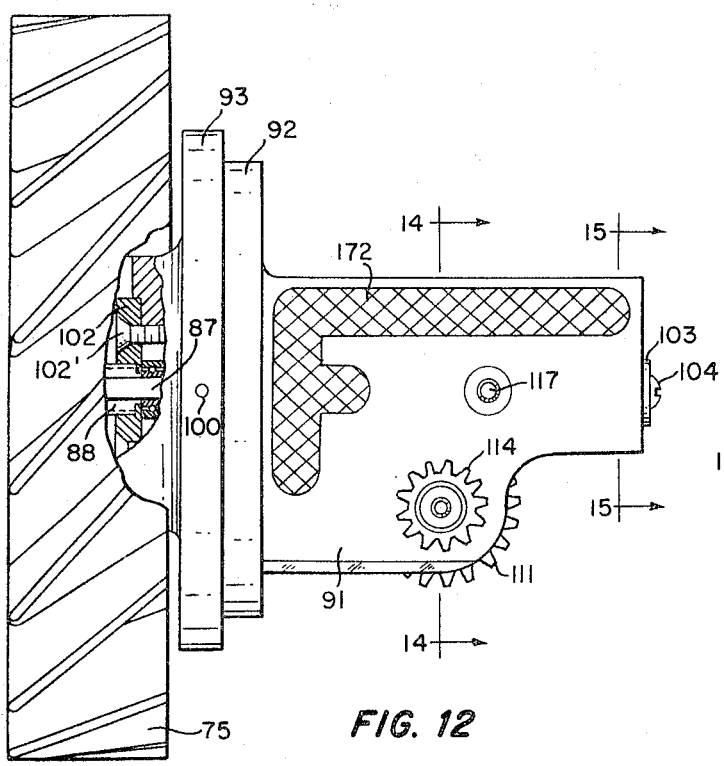
FIG. 12 is a fragmentary top plan view showing drive mechanism connected to the rotor.

A drive coupling 133 is rigid with gear 116. Coupling 133 is non-rotatably connected to a vertical shaft 134 that extends through bore 120' into non-rotatable connection with a coupling member 135, in turn connected by a universal joint 136 with a magnetic coupling member 137 having a tubular portion 138 rotatable about shaft 131. As shown, spaced bearings 139 and 141 are provided between shaft 131 and the coupling member 137, and an annular permanent drive magnet 142 is fixed on coupling member 137. Coupling member 137 is suitably axially located with respect to shaft 131, as by snap ring 130 (FIG. 10).

A cooperating magnetic coupling member 143 has a tubular portion 144 surrounding the upper end of casing 122 and rigidly mounting an annular permanent driven magnet 145 substantially axially coextensive with magnet 142. Bearings 146 and 147 are provided between coupling member 143 and shaft 132, so that coupling member 143 is freely rotatably mounted on shaft 132. The assembly of bearings 146 and 147 and spacer 140' are fixed in member 143 by snap ring 140 (FIG. 10).

The upper end of coupling member 143 projects into a gear train unit 148 having an initial gear 149 fixed on coupling member 143, and an output shaft 151 connected to register drive mechanism 150 in a conventional manner.

Since casing 122 provides a sealed extension of measuring chamber housing 59, it will be seen that the interior of the measuring chamber is sealed against the escape of gas or other fluid into the drive space at 48, drive from the rotor being transmitted through casing 122 magnetically. The particular magnetic drive means may be any suitable type, although preferably magnets 142 and 145 are so-called ceramic magnets and have opposed poles at opposite axial ends. The disclosed assembly wherein accurately coaxial magnetic coupling members are rotatably mounted on spaced ends of the same shaft assembly (131, 129, 132) provides a more efficient drive wherein the magnetic gap may be reduced to a minimum for optimum transmission of drive force.

Figure 2:
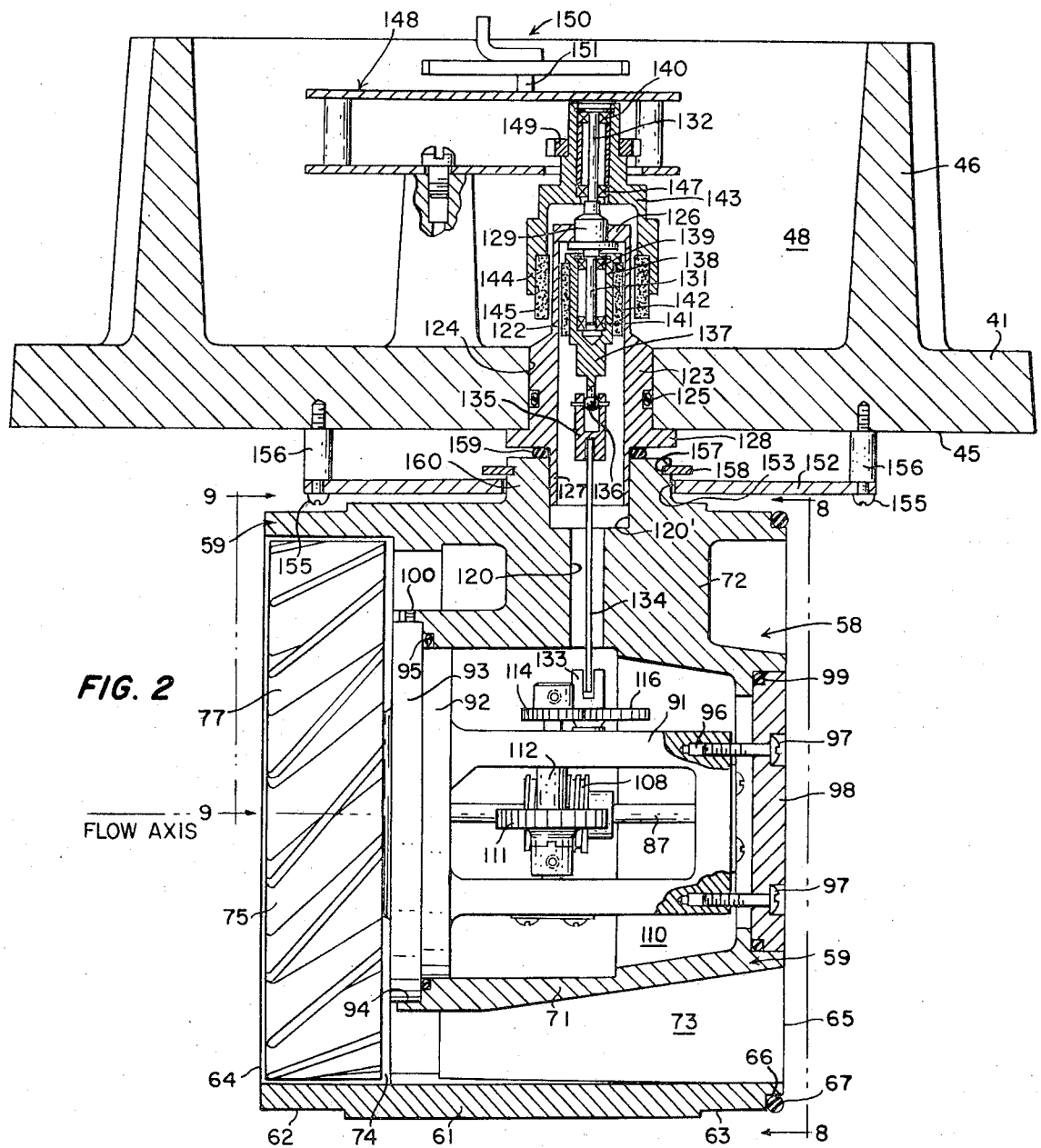
FIG. 2 is an enlarged fragmentary side elevation view in section showing the rotor, measuring chamber and register drive in greater detail.
Figure 2A:
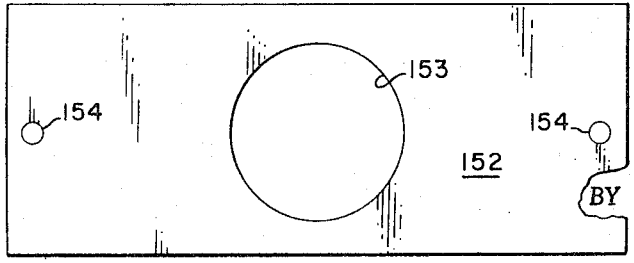
FIG. 2A is a plan view of the adaptor plate that locates the measuring chamber in the assembly.
Figure 3:
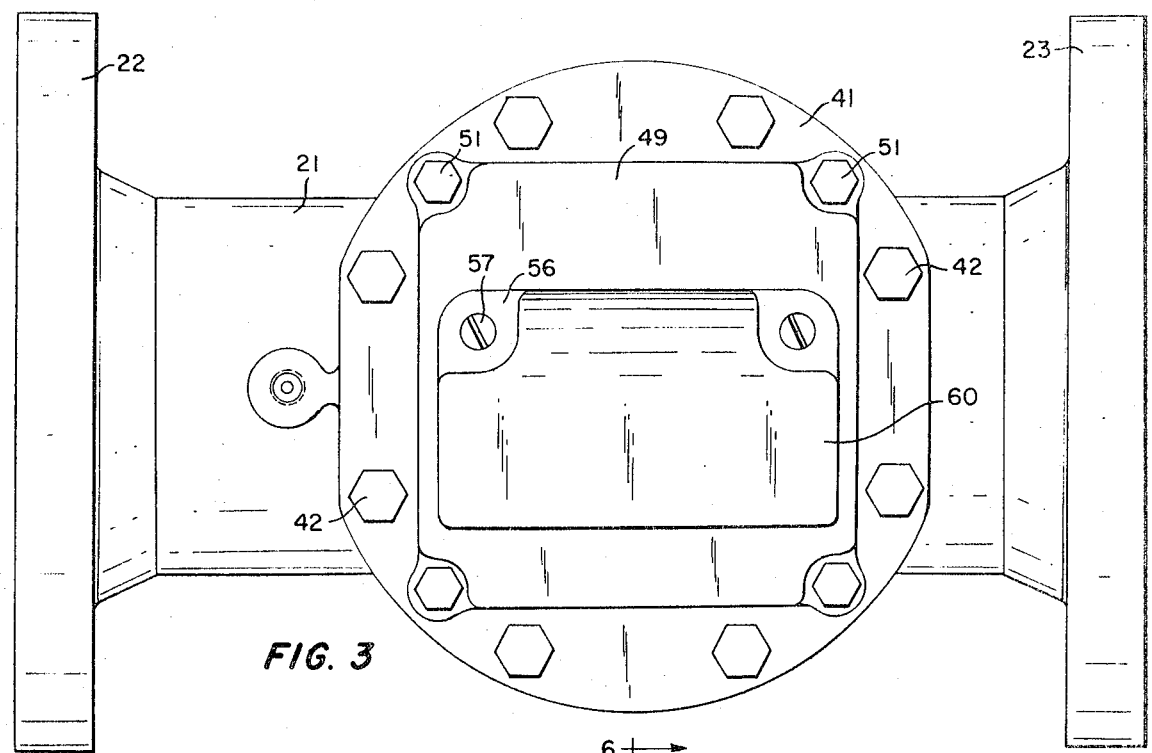
FIG. 3 is a top plan view of the meter assembly of FIG. 1.
Figure 4:
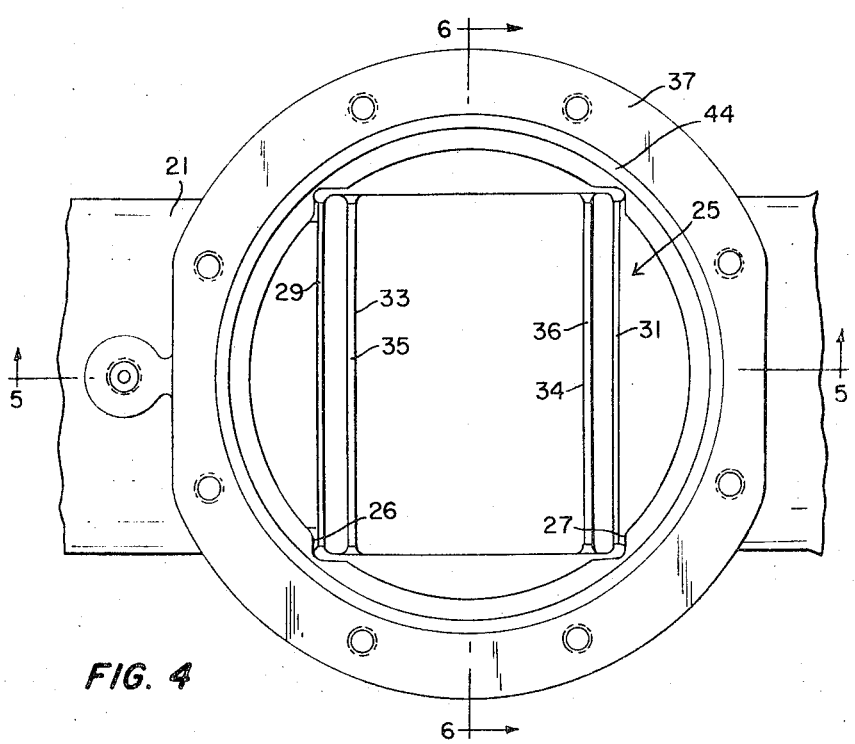
FIG. 4 is a fragmentary top plan view showing the interior of the meter body, the register and measuring chamber being removed.
Figure 5:
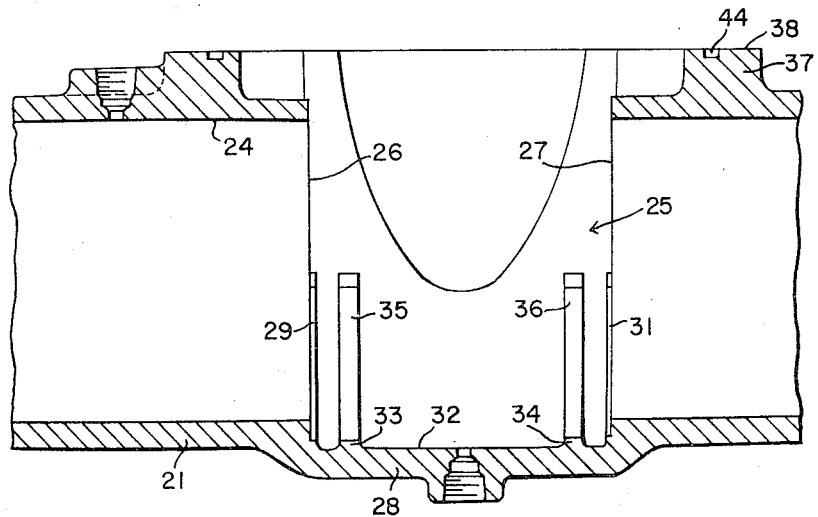
FIG. 5 is a side elevation in longitudinal section through the meter body substantially on line 5—5 in FIG. 4.
Figure 6:
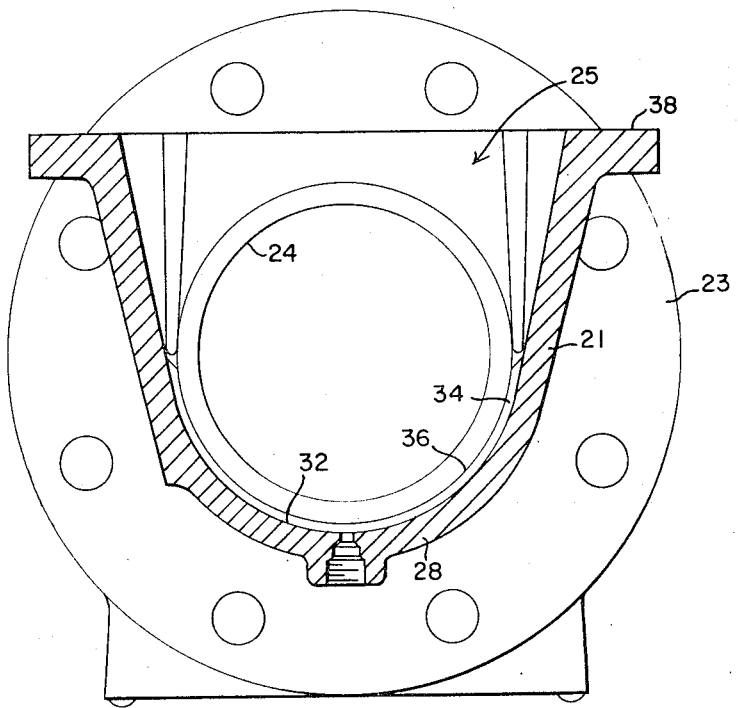
FIG. 6 is an end elevation of the body in section substantially on line 6—6 in FIG. 4.
Figure 7:
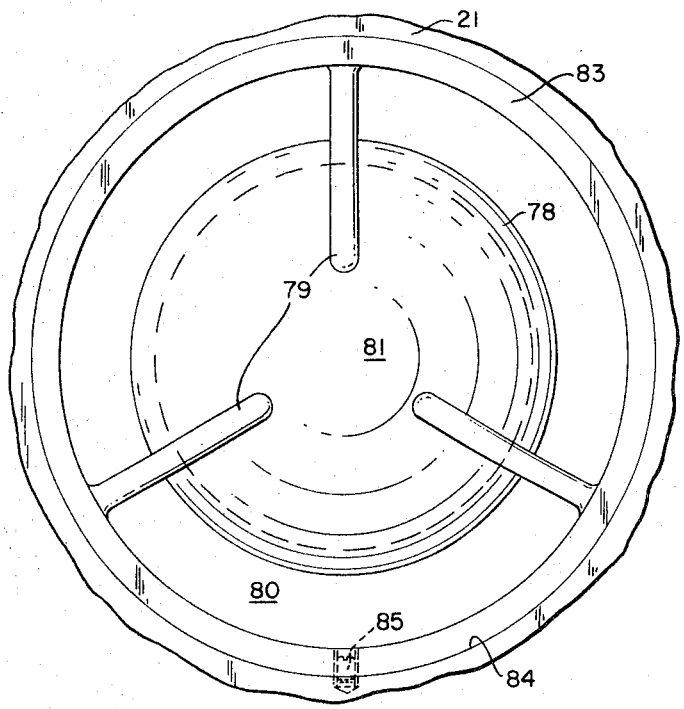
FIG. 7 is an end view of the assembly of FIG. 1 looking from left to right in FIG. 1.

Referring to FIGS. 1, 2 and 2A the upper end of housing 59 is formed with a rigid cylindrical boss 160 surrounding bore section 121 and projecting toward casing flange 128. An adaptor or extractor plate 152, best shown in FIG. 2A, has a central opening 153 for surrounding boss 160, and end openings 154 through which extend screws 155 into depending posts 156 rigid with plate 41. Above plate 152, boss 160 is formed with an annular recess 157 mounting a snap ring 158 of larger diameter then opening 153. A resilient gasket 159 is interposed between the upper end of boss 160 and casing flange 128 in the assembly.

As shown in FIGS. 1 and 2, adapter plate 152 is parallel to the flow axis in the assembly and its circular opening 153 is concentric with opening 124 in cover plate 41 and eccentric with the circle containing the bolt hole centers of plate 41. Opening 153 surrounds cylindrical boss 160 to locate the measuring chamber circumferentially about the flow axis and longitudinally of the flow axis, but with sufficient small clearance to compensate for manufacturing tolerances.

Plate 152 also may serve as an extractor device. When cover plate 41 is being removed from the body, normally the entire measuring chamber assembly 58 moves with it but, should casing 122 tend to pull out of bore 120', plate 152 will engage snap ring 158 and lift the measuring chamber.

Referring now to FIG. 1, the vertical axis X designates the common axis of openings 124 and 153 and drive shaft 134, and the vertical axis Y indicates the center of the circle containing the bolt hole centers in plate 41. Axis Y is also concentric with the register drives at 150 and 55. This longitudinal offset relation of axes X and Y insures that the measuring chamber attached to plate 41 can be inserted into the meter body only in the correct operative position with the rotor upstream as shown in FIG. 1. Thus the assembly cannot be improperly made either initially or during repair.

Measuring chamber unit 58 is mounted on cover plate 41 before the cover plate is mounted on the body. This subassembly is shown in FIG. 2. Vertical drive shaft 134 of such length as to have slight axial float between its coupling connections.

Casing 122 is mounted in plate 41 by inserting casing 122 into opening 124 from the underside of plate 41. Then housing 59 is mounted over the open end of casing 122 by insertion of boss 160 through adapter plate opening 153 until gasket 159 is compressed, and snap ring 158 is dropped down into place on the boss above plate 152.

Now the assembled cover plate and measuring chamber subassembly is inserted into body opening 25, the opposite ends of housing 59 being slidably guided by body surfaces 26 and 27. Bolts 42 are inserted and tightened to seat the measuring chamber on ribs 33 and 34, and this further compresses gasket 159 until in the assembly it has the dual function of a biasing spring for the measuring chamber and a seal for the connection between casing 122 and the measuring chamber.

The common shaft means 131, 132 for mounting the annular magnets provides for better alignment and closer coactive position of the magnets to reduce the air gap and improve effective operation.

Referring to FIG. 10 the driver magnet carrying coupling member 137 is effectively assembled on shaft 131 by washer 130. Bearings 139 and 141 are separated by a spacer 141' but are rotatable upon and slidable along shaft 131. This permits magnet 142 to rise into optimum longitudinal association with magnet 145 when the latter surrounds it to minimize end thrust forces during operation.

The embodiments of the invention in which an exclusive property or privilege is claimed are defined as follows:

1. In a fluid meter, a body, fixed means within the body defining an internal substantially annular wall for providing an annular fluid flow passage and defining a space surrounded by said wall, means closing said space at opposite ends with respect to fluid flow through the meter comprising a transverse upstream wall and a transverse downstream wall, means including said upstream wall providing an open ended rotor chamber immediately upstream of said upstream wall, a rotor within said chamber having a vaned periphery aligned with said annular passage, a rotatable shaft upon one end of which said rotor is fixed extending from said chamber into said space, means rotatably mounting said shaft on said transverse upstream wall, register actuating means including shaft means extending from said space exteriorly of said body, mechanism within said space operatively drive connecting said rotor shaft to said shaft means, and means within said space supporting said mechanism and rotatably mounting the other end of said rotor shaft.

2. In the fluid meter defined in claim 1, means for admitting upstream fluid pressure into said space for pressure equalization.

3. In the fluid meter defined in claim 2, said pressure admitting means comprising an opening in said upstream wall and a filter at said opening.

4. In the meter defined in claim 1, at least one substantially radial integral support rib for said internal wall, said rib being formed with a bore open at its inner end to said space for passing said register actuating shaft means.

5. In a fluid meter, a body, fixed means within the body defining an internal substantially annular wall for providing an annular fluid flow passage and defining a space surrounded by said wall that is closed at opposite ends with respect to fluid flow through the meter, means at one end of said space providing an open ended rotor chamber, a rotor within said chamber carried by a rotatable rotor shaft extending within said space, a bracket within said space having bearings supporting said rotor shaft and said mechanism, means removably mounting said bracket on said internal wall whereby said bracket with the rotor and rotor shaft thereon may be installed or removed as a subassembly, register actuating means including shaft means extending from said space exteriorly of said body, and mechanism within said space operatively drive connecting said rotor shaft to said shaft means.

6. In the meter defined in claim 5, said bracket having bearings supporting the rotor shaft and being provided at an end adjacent the rotor chamber with an imperforate seating portion for closing said space at that end, a removable closure member mounted on said internal wall to extend across the other end of said space, and fastener means on said removable closure member operatively connected with said bracket for tightly seating said imperforate portion at said one end of said space.

7. In the meter defined in claim 6, said seating portion comprising an enlarged flange on said bracket adapted to fit upon an associated end shoulder of said internal wall, said removable closure member being a plate carried by the internal wall, and said fastener means comprising threaded elements reacting between said bracket and said closure member.

8. In a gas meter comprising a body having a longitudinal flow passage, a measuring chamber assembly within said body passage comprising a housing having spaced inner and outer peripheral walls defining an annular flow passage section therethrough and an axially open rotor chamber at one end, a rotor shaft rotatably mounted in the assembly parallel to the flow axis of said body passage and extending from said chamber within said housing, a rotor fixed on said shaft within said rotor chamber, register drive mechanism connected to said shaft and extending through said housing walls externally of said body passage, means blocking flow of gas through said housing internally of said inner peripheral wall of the housing, and means sealing against passage of gas between the outer peripheral wall of the housing and said body.

9. In the gas meter defined in claim 8, said sealing means comprising a compressible resilient means interposed between said housing and the interior of the meter body.

10. In the gas meter defined in claim 8, said rotor chamber being surrounded by an end portion of said outer peripheral wall extending beyond the corresponding end of said inner peripheral wall.

11. In the gas meter defined in claim 10, said rotor having an annular rim mounting blades that extend across said annular passage section, said rim being in longitudinal alignment with said inner peripheral wall of the housing, and said end portion of said outer peripheral wall terminating in an annular surface lying in a plane perpendicular to the flow axis and closely adjacent said rotor, and said body being provided with coplanar annular surfaces longitudinally aligned respectively with the outer peripheral wall of the housing and the rotor rim.

12. In a gas meter comprising a body having a flow passage, a measuring chamber assembly mounted within the meter in said passage comprising a housing having an outer peripheral wall seated within the body and a spaced inner peripheral wall defining with said outer wall an annular flow passage section and a rotor chamber that is open upstream, a rotor shaft rotatably mounted on said housing and extending from said rotor chamber within said housing and a rotor on one end of said rotor shaft within said rotor chamber, closure means closing the upstream and downstream ends of said measuring chamber radially inwardly of said annular flow passage section, a register drive shaft extending substantially radially from the interior of the space enclosed by said inner peripheral wall and said closure means through said outer peripheral wall, mechanism in said space connecting said rotor shaft to said register drive shaft, and means in said space mounting said mechanism and rotatably mounting the other end of said rotor shaft.

13. In a gas meter comprising a body having a flow passage, a measuring chamber assembly mounted within the meter in said passage comprising a housing having an outer peripheral wall seated within the body and a spaced inner peripheral wall defining with said outer wall an annular flow passage section and a rotor chamber that is open upstream, a rotor shaft rotatably mounted in said assembly and a rotor on said rotor shaft within said rotor chamber, closure means closing the upstream and downstream ends of said measuring chamber radially inwardly of said annular flow passage section, a register drive shaft extending substantially radially from the interior of the space enclosed by said inner peripheral wall and said closure means through said outer peripheral wall, mechanism in said space connecting said rotor shaft to said register drive shaft, a bracket supporting said mechanism disposed within said space and formed at one end with a flanged section having a fluid tight seat on said inner wall adjacent said rotor chamber, and fastener means extending between the closed downstream end of the measuring chamber and said bracket which when drawn tight increases said seal.

14. In the meter defined in claim 13, spaced bearings in said bracket mounting said rotor shaft, and said mechanism comprising gearing mounted within the bracket connecting said rotor shaft to said register drive shaft.

15. In a gas meter having a body formed with a through passage to which access is gained through a side aperture, a measuring chamber assembly insertable through said aperture and incorporating a rotor adapted to be disposed in the direct path of fluid flow through the meter body, a cover member removably mounted over said side aperture and means mounting said measuring chamber assembly on the inner side of said cover member comprising a tubular casing extending through an opening in said cover member with a closed end outside the cover member and with an open end fitted into a bore in the adjacent portion of said measuring chamber assembly, a rotatable shaft on which said rotor is mounted extending into said measuring chamber assembly, register drive means connected to said shaft within the measuring chamber assembly and including a magnetic drive element disposed within said tubular casing, and resilient means compressed between the casing and measuring chamber assembly functioning to both seal the joint between the casing and measuring chamber assembly and to urge said measuring chamber assembly onto its seat in the body.

16. In a gas meter having a body formed with a longitudinal through passage to which access is gained through a side aperture, a cover removably mounted over said aperture, register mechanism on the outer side of said cover, a measuring chamber assembly depending from the inner side of said cover, said measuring chamber assembly comprising a housing having spaced inner and outer peripheral walls defining an annular flow passage section therethrough and an axially open rotor chamber at one end, resilient seal means between the outer peripheral wall of the housing and said body passage, transverse walls defining a substantially enclosed gear chamber within said inner peripheral wall at the other end of said measuring chamber assembly, rotatable shaft means mounting a rotor in said rotor chamber and extending within said gear chamber, and register drive means between said shaft means and said register mechansim including drive shaft means connected by gearing to said rotor shaft means within said gear chamber and extending substantially at right angles thereto through said housing and said cover.

17. In the gas meter defined in claim 16, means providing for controlled passage of gas through one of said transverse walls into said gear chamber for pressure equalization.

18. In a meter having a body formed with a through passage to which access is gained through a side opening, a measuring chamber assembly insertable through said aperture and incorporating a rotor adapted to be disposed in the direct path of fluid flow through the meter body, cover means detachably secured to said body over said side opening, means suspending said measuring chamber assembly from said cover means, and cooperating means on said cover means and said body permitting insertion of said measuring chamber assembly into said body only in such orientation that the rotor will be disposed to face a predetermined direction in the fluid flow passage.

19. In the meter defined in claim 18, said cover means comprising a cover member secured to said body by fastener means comprising a row of bolts concentric about an axis, and said measuring chamber being suspended from said cover member in offset relation to said axis.

* * * * *